March 24, 1970  A. CLARK  3,501,837
DENTAL IMPRESSION TRAY, PRIMARILY FOR POSTERIOR TEETH
Filed June 10, 1966

INVENTOR.
ALEXANDER CLARK

United States Patent Office 3,501,837
Patented Mar. 24, 1970

3,501,837
DENTAL IMPRESSION TRAY, PRIMARILY FOR POSTERIOR TEETH
Alexander Clark, 1801 Asheville Highway,
Hendersonville, N.C. 28739
Filed June 10, 1966, Ser. No. 556,597
Int. Cl. A61c 9/00
U.S. Cl. 32—17                                                                11 Claims

ABSTRACT OF THE DISCLOSURE

The specification discloses a dental impression tray primarily intended for making posterior dental impressions through the use of an impressionable material adapted to be carried thereby, and adapted for subsequent use in making dental bridges, crowns, false teeth, or the like. The complete device includes a removable rectangular tray portion which is usually made of vertically apertured, sterilizable plastic material and which has a pair of laterally spaced side parts provided with a corresponding pair of parallel, longitudinally apertured mounting sleeve portions adapted to be slidably removably received on corresponding first and second longitudinal side members of a substantially U-shaped, manually holdable mounting bracket with said rectangular, apertured plastic tray portion having a horizontal thin-sheet perforate membrane member lying across and between the laterally spaced side parts thereof and adapted to carry and hold the impressionable dental material both above and below said thin-sheet perforate membrane member. The plastic tray portion is removable for sterilization and replacement, or can be replaced with another tray portion of a different size when needed for the purpose of making dental impressions of larger or smaller teeth. Also, in one preferred form, one of the side members of the mounting bracket may be longitudinally extendable and retractable so as to be adapted for mounting engagement with a longer or shorter, rectangular, vertically perforated, removable plastic tray portion.

---

Generally speaking, the present invention relates to a dental impression tray which is primarily intended for making posterior dental impressions for use in making dental bridges, crowns, false teeth, or the like. It is normally adapted to be provided with an impressionable material which may be of various different types, although an exemplary form thereof frequently used comprises a rubber-based impressionable material capable of jelling, setting, or hardening rapidly after the dental impression is taken and thereafter used in the subsequent manufacture of bridges, crowns, false teeth, or the like, in a manner such that they will properly fit into the person's mouth with virtually no disturbance in the shape, configuration, and positioning of his tooth, gum, and mouth structure.

The above is important for a number of reasons, including the fact that any alteration in the positioning of a bridge, crown, set of false teeth, or the like, from that conforming to the configuration of the person's dental arch and tooth and gum structure will produce a difference in the bite or opposition of said replaced teeth with respect to the similar teeth in the opposed jaw and this will be very undesirable from the mechanical and efficiency standpoints since the opposed teeth will then not function properly.

Also, such incorrect opposition of teeth in opposite jaws frequently leads to the virtual non-use of certain of the opposed natural teeth, and the consequent deterioration thereof through such non-use, often results in the early loss of such real, improperly-opposed, effectively non-used teeth.

Additionally, the proper positioning of replacement artificial teeth such as bridges, crowns, false teeth, etc., is important for cosmetic reasons, since the entire appearance of the lower portion of a person's face is substantially effected by the configuration and exterior shape of his mouth and adjacent lip and cheek portions, and these are changed substantially in exterior appearance whenever artificial replacement teeth, such as bridges, crowns, false teeth, or the like, are improperly positioned with respect to the ideal position thereof.

For all of the above-mentioned reasons and others too numerous to detail here, it is important that initial dental impressions be taken before removing teeth for subsequent replacement by bridges, crowns, false teeth, or the like, and even in the event that a tooth has already been previously removed, it is important that such impressions be taken to determine the configuration of portions of the dental arch adjacent to the previously-removed tooth for use in determining the proper configuration and positioning of the replacement tooth.

The impressionable material may be of the old-fashioned wax bit type, any other type of impressionable material which has been used by dentists for similar purposes, rubber jell materials of the more-recently-employed type, or any other material capable of receiving and retaining a dental impression. Furthermore, the impression material may be positioned on only the upper side of the tray for making a dental impression of only desired upper teeth, may be positioned on only the lower side of the dental tray for making a dental impression of only certain desired lower teeth, or may be positioned on both the upper and lower sides of the tray for making simultaneous upper and lower dental impressions of desired upper and lower teeth.

The novel device of the present invention is primarily intended for taking dental impressions of posterior teeth and has a structure particularly suitable for this purpose, but it may, if desired, be employed for taking impressions of anterior teeth also.

The dental impression tray may be supplied in a plurality of different sizes, each including a removable tray portion of a different size adapted to be mounted on a mounting bracket portion of the novel device of the present invention so as to be adapted for taking dental impressions of various sizes—that is, with the size usually varying in accordance with the number of teeth forming the impression. Also, the mounting bracket may, in one exemplary form of the present invention, be constructed in a manner such as to be capable of effective size modification (usually by effectively lengthening same) so as to be capable of removably mounting a different size of the novel removable tray portion of the device which is carried by said mounting bracket.

The removable tray portion adapted to be carried by the mounting bracket may comprise a pair of laterally spaced side parts integrally and substantially horizontally provided with and interconnected by a thin-sheet perforate membrane member lying in a substantially horizontally directed, substantially vertically intermediate plane extending across an otherwise open space between said side portion and also across a similar open space defined by the mounting bracket. The removable tray portion is an integral structure usually formed of molded plastic material of a heat-resistant sterilizable type such as polypropylene, or the like, thus making it possible to re-use the removable tray portion after removal of the impressionable material therefrom which has been used for taking dental impressions and after a subsequent sterilization of the removable tray portion and also sterilization of the mounting bracket and a handle means connected thereto. Thus, the entire device can be used and re-used virtually indefinitely.

In one exemplary form of the invention, the removable tray portion referred to above is of substantially rectangular configuration as seen in top plan view, and said laterally spaced side parts are provided with parallel longitudinally apertured mounting sleeve portions extending therethrough from front to back and adapted to be slidably mounted on corresponding parallel laterally spaced first and second longitudinal side members of the previously-mentioned mounting bracket, which is of substantially U-shaped configuration. It will be understood that this type of construction makes it possible to very easily slide the laterally spaced parallel longitudinal mounting sleeve portions of any of a plurality of different-sized rectangular tray portions onto the corresponding longitudinal side members of the U-shaped mounting bracket in a manner such as to push the perforate membrane member across the rectangular open space between said side parts of the rectangular tray portion and the longitudinal side members of the mounting bracket carrying same so that the tray portion will be in a proper position for dental-impression-taking usage.

In an exemplary form of the invention, the mounting bracket is provided with a handle means extended to a location remote therefrom for convenient manual grasping thereof at a location exterior of one's mouth while maintaining the U-shaped bracket and rectangular tray portion at a rear location within the mouth for the purpose of taking dental impressions of posterior teeth in an impressionable material adapted to be carried by and engaged by the removable tray portion.

In a preferred exemplary form of the invention, the above-mentioned handle means comprises an extension of one of the parallel longitudinally directed side members of the mounting bracket, with said extended one thereof being provided at a remote end of said extended portion with a laterally directed enlarged handle portion mounted thereon in a removable manner which will thus allow the tray portion to be slidably removed therefrom whenever desired, after which the enlarged handle portion may be remounted on the extended one of said side members of the mounting bracket for subsequent use as a handle.

The mounting bracket and handle are also made of a heat-resistant sterilizable material, with the bracket and the extended side member thereof comprising a part of the handle means, in certain forms of the invention being made of a metallic material such as stainless steel, plated base metal, or the like, although not specifically so limited.

The removable tray portion may be provided with a plurality of perforations of a size such as to allow an impressionable material to at least partially extend thereinto prior to hardening, jelling, and setting.

In one exemplary form of the present invention, one of said longitudinal side members of the mounting bracket (usually the one not extended to form said handle means) is provided with telescopic extension sleeve means and travel-limiting stop means to allow same to be extended to a desired length to receive and mount a corresponding interchangeable one of said removable rectangular tray portions of a corresponding selected length adapated for the particular dental impression work to be done.

With the above points in mind, it is an object of the present invention to provide a novel dental impression tray of the character referred to herein, generically and/or specifically, which may include any or all of the features referred to herein, either individually or in combination, and which is of extremely simple, inexpensive construction suitable for repeated sterilization and re-use and adapted for ready manufacture at a very low cost per unit whereby to be conducive to widespread production distribution, and use of the invention for the purposes outlined herein.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, two exemplary embodiments of the invention are illustrated in the hereinbelow-described figures of the accompanying single drawing sheet and are described in detail hereinafter.

FIG. 1 is a top plan view of one exemplary embodiment of the invention in fully-assembled, operative relationship ready for the reception of and engagement with the tray portion thereof of impressionable material immediately prior to a dental-impression-taking operation. This view shows the mounting bracket in solid lines in its minimum-size adjusted relationship removably mounting a minimum-size tray portion and, in phantom lines, shows said mounting bracket extended to its maximum-size relationship mounting a phantom line maximum-size tray portion.

FIG. 2 is a cross-sectional view taken substantially along the plane indicated by the arrows 2—2 of FIG. 1.

FIG. 3 is a fragmentary view taken on substantially the same plane as FIG. 2, although drawn to a somewhat larger scale, and illustrates the device in actual impression-taking usage positioned between opposed upper and lower teeth and associated gum structures of a mouth and with impressionable material positioned on both upper and lower sides of the removable tray portion, although it should be clearly understood that the invention may be employed with impressionable material on just the upper side, on just the lower side, or on both sides, as shown in FIGURE 3.

FIG. 4 is a fragmentary sectional view taken substantially along the plane indicated by the arrows 4—4 of FIG. 1 and illustrates the mounting of the exemplary enlarged handle portion on the extended longitudinal side member of the mounting bracket whereby to effectively comprise extended handle means, with the lateral handle portion being controllably disengageable and reengageable to permit mounting and dismounting of the tray portion on the mounting bracket.

Figure 1:
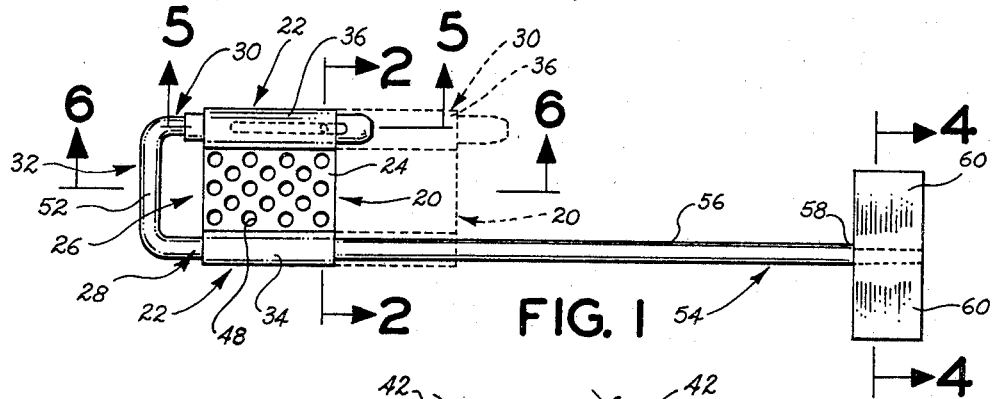

Generally speaking, the dental impression tray of the present invention, in a first exemplary form, thereof may be said to comprise a substantially rectangular tray portion, such as is generally designated by the reference numeral 20, which includes a pair of similar, positionally reversed, laterally spaced side parts, each of which is generally designated by the reference numeral 22 and each of which is integrally and substantially horizontally provided with and interconnected by a thin-sheet, flexible, molded plastic, perforate membrane member 24 lying in a substantially horizontally directed, substantially vertically intermediate plane extending across the otherwise open space generally designated by the reference numeral 26, which lies between the side parts 22 and also between the first and second parallel longitudinal side members generally designated by the reference numerals 28 and 30, respectively, of the U-shaped mounting bracket generally designated by the reference numeral 32.

The arrangement is such that the rectangular tray portion 20, and the membrane member 24 thereof, are each of substantially rectangular shape as seen in top plan view. This is best shown in FIG. 1.

The above-mentioned side parts 22 are provided with parallel, longitudinally apertured mounting sleeve portions 34 and 36 defining longitudinal apertures 38 and 40 extending therethrough from front to back and of different cross-sectional diameter in the exemplary first form of the invention illustrated in order to slidably receive therethrough the correspondingly different diameters of the first and second longitudinal side members 28 and 30. The details of this diameter difference will be explained in greater detail hereinafter.

Each of the side parts 22 is provided with vertically directed retaining wall portions 42 and 44 substantially perpendicularly positioned relative to the thin-sheet membrane member 24 and being symmetrically disposed, both above and below same, the parts of said retaining wall portions extending above the level of said membrane member 24, each being designated by the reference numeral 42 and the parts thereof extending below the membrane member 24, each being designated by the reference numeral 44.

In the exemplary first form of the invention illustrated, both retaining wall portions 42 and 44 and the membrane member 24 are perforate, as provided by a plurality of through-passing apertures 46 in the case of the retaining wall portions 42 and 44 and 48 in the case of the membrane member 24. Said apertures 46 and 48 are normally of a relatively small size to allow an impressionable material, such as that designated by the reference numeral 50 in FIG. 3 for example, to at least partially extend thereinto prior to hardening, jelling, and setting, whereby to firmly mount said impressionable material 50 with respect to the tray portion 20. I have found that one suitable diameter for the perforations or apertures 46 and 48 is approximately 1½ millimeters. However, the invention is not specifically limited to this diameter alone and is subject to suitable modification thereof and, in certain forms of the invention, various other irregularity means, or engagement means, for the impressionable material 50 may be provided.

The previously-mentoned U-shaped mounting bracket 32 may, in one preferred exemplary form of the invention, be made of a non-corrodible, easily sterilizable metal, such as stainless steel or some base metal appropriately plated with such a substantially non-corrodible, readily sterilizable outer coating.

In the exemplary first form of the invention, the U-shaped mounting bracket 32 has the two side members 28 and 30 integrally connected by a lateral member 52. However, in certain forms of the invention, this may include a telescopic-type junction, which may comprise an adjustable connection or one which has been initially adjusted to provide a desired width to the U-shaped bracket 32 and then fixedly immobilized.

Figures 2, 3, 4:
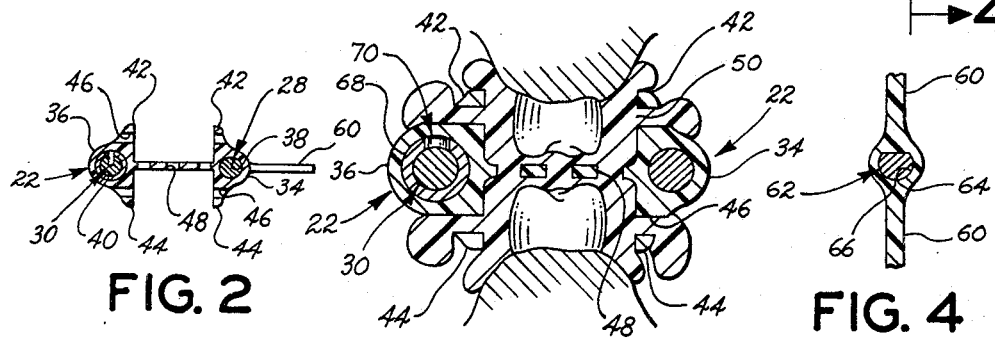

The mounting bracket 32 is adapted to have the mounting sleeve portions 34 and 36 slidably moved into the mounted relationship clearly shown in FIGS. 1, 2, and 3 for mounting the tray portion 20 for use and, conversely, is adapted to have said mounting sleeve portions 34 and 36 removed from said longitudinal side members 28 and 30 of the mounting bracket 32 whenever the tray portion 20 is to be interchanged with a larger or smaller tray portion 20. For example, one such larger tray portion 20 is shown in phantom lines in FIG. 1.

The mounting bracket 32 is provided with handle means, such as is generally designated by the reference numeral 54, which is extended to a location remote from the bracket means 32 for convenient manual grasping of said handle means 54 at a location exterior of a person's mouth while positioning the U-shaped mounting bracket 32, and the removable dental tray portion 20, within a person's mouth for the purpose of taking dental impressions (usually of posterior teeth, although not specifically so limited) in an impressionable material, such as that shown at 50 in FIG. 3, adapted to be carried by said tray portion 20.

In the exemplary first form of the invention illustrated, the handle means 54 comprises an extension 56 of the previously-mentioned first one 28 of said parallel longitudinally directed side members of the mounting bracket 32, which is provided at a remote end 58 of said extended portion 56 thereof with a laterally directed enlarged handle portion 60 removably mounted thereon. Thus, it will be understood that when the tray portion 20 is to be initially mounted on the bracket 32 in a position such as is best shown in FIG. 1, or when the tray portion 20 of FIG. 1 is to be removed from the mounting bracket 32, the enlarged handle portion 60 is removed from the remote end 58 of the extended portion 56 of the bracket side member 28, thus making it possible to directly slide the mounting sleeves 34 and 36 either onto the bracket 32 into the mounted position shown in FIG. 1 or to perform the opposite operation by directly sliding the mounting sleeve portions 34 and 36 off of the longitudinal side members 28 and 30 of the mounting bracket 32. Of course, both the tray portion mounting and the tray portion dismounting operations just described require that the mounting sleeve portion 34 slide along the extended portion 56 and also past the end 58 thereof (which has had the transverse handle portion 60 previously removed therefrom).

The enlarged transverse handle portion 60 and the extended portion 56 of the longitudinal side member 28 of the mounting bracket 32 are provided at the junction end 58 with controllably separable keyed engagement means, such as generally designated by the reference numeral 62 in FIG. 4, which is merely exemplary of a variety of different types of controllably separable keyed engagement means which may be employed in lieu thereof, if desired. This is also true of the enlarged transverse handle portion 60, which is merely exemplary of various different forms which said handle portion may assume within the scope of the present invention.

In the exemplary first form of the invention illustrated, the controllably separable keyed engagement means 62 takes the form of a non-round aperture 64 in the transverse handle portion 60, longitudinally slidably engageable (in certain forms, with a tapered frictional fit) with a correspondingly shaped and sized non-round exterior keyed portion 66 formed on the extreme end 58 of the extended portion 56 of the side member 28 of the U-shaped bracket 32.

In the exemplary first form of the invention, the entire tray means 20 may be made of integral molded plastic construction of a heat-resistant sterilizable material such as polypropylene or any other functional equivalent.

Figures 5, 6:
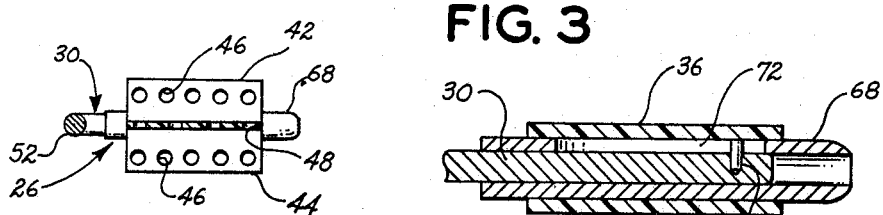
FIG. 5 is an enlarged fragmentary sectional view taken substantially along the plane indicated by the arrows 5—5 of FIG. 1 and illustrates the detail of one exemplary form of telescopic extension sleeve means and travel-limiting stop means positioned at one side of the mounting bracket to make it suitable for removably mounting various tray portions of various different lengths.
FIG. 6 is a fragmentary view, partly in elevation and partly in section, taken substantially along the plane indicated by the arrows 6—6 of FIG. 1.

It has been mentioned hereinbefore that the longitudinal aperture 40 in the mounting sleeve portion 36 is larger in diameter than the longitudinal aperture 38 in the other mounting sleeve portion 34. The reason for this, in the first exemplary form of the invention illustrated, is the fact that the second longitudinal side member, indicated generally at 30, of the mounting bracket 32, is provided with telescopic extension sleeve means 68 and travel-limiting stop means, indicated generally at 70, to allow said second side member 30 to be effectively extended to a desired length, such as that generally designated in phantom at 30 in FIG. 1, and to carry a corresponding mounting sleeve portion 36, shown in phantom in FIG. 1, of a corresponding interchangeable and larger dental tray portion 20 shown in phantom in FIG. 1. In other words, the telescopic extension sleeve means 68 may be effectively retracted relative to the inner member 30' of the side member 30 or effectively extended with repect thereto to an extent determined by the travel-limiting stop means 70, which comprises, in the exemplary first form of the invention illustrated, a longitudinal slot 72 formed in the telescopic extension sleeve means 68 and a stop pin 74 placed in said slot 72 and driven inwardly into fixed mounted inner engagement with the inner rod portion 30' of said second side member generally designated at 30. This is most clearly shown in FIG. 5 and clearly provides a structure adapted to limit the extension and retraction of the telescopic extension sleeve means 68, which may fit on the rod portion 30' with sufficient frictional engagement therewith to maintain any selected longitudinally-adjusted position with respect thereto.

It is the increased diameter of the telescopic extension sleeve means 68 which makes necessary the diameter increase of the longitudinal aperture 40 of the mounting sleeve portion 36 as previously referred to.

However, the invention is not limited to employing a telescopic extension sleeve means such as that shown at 68 in all forms thereof and in certain modifications, said extension sleeve 68 may be eliminated, in which case both side members corresponding to those shown at 28 and 30 will be of substantially the same diameter and, therefore, apertures corresponding to those shown at 38 and 40 of mounting sleeve portions corresponding to those shown at 34 and 36, all of the first form of the invention, may be of substantially the same diameter rather than of different diameters, as shown in the first form of the invention illustrated in FIGS. 1–7.

Figures 7, 8:
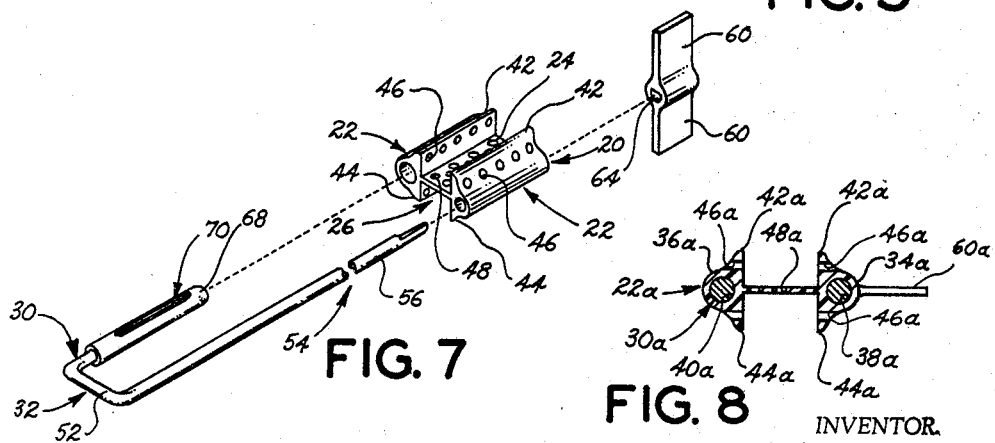
FIG. 7 is an exploded perspective view of the exemplary first form of the invention.
FIG. 8 is a view similar to FIG. 2, but illustrates a modified form of the invention.

Such a modification is illustrated very fragmentarily in FIG. 8, which is a view similar to FIG. 2 but illustrates a modified structure of the type just described. In this view, parts similar to those of the first form of the invention are designated by similar reference numerals, followed by the letter *a*, however, and since all portions of the apparatus function in a manner similar to the corresponding portions of the first form of the invention described in detail hereinbefore, no further and repetitive detailed description of the FIG. 8 modification of the invention is thought necessary or desirable.

For exemplary purposes, it should be noted that I have found that constructing the upper and lower retaining wall portions 42 and 48 so that the overall combined height thereof is approximately 5/8 of an inch and so that the overall length thereof is approximately 1 5/8 inches, and constructing the integral membrane member 24 so that it will be approximately 1½ inches, or slightly less, in width and will be less than 1/32 of an inch in thickness provides a tray portion 20 which is highly effective in use. In such an arrangement, the first mounting sleeve portion aperture 38 will normally be approximately 1/8 of an inch in diameter. However, the second mounting sleeve portion aperture 40 will normally be slightly larger to provide for the reception of the telescopic extension sleeve 68, except in the modified form illustrated in FIG. 8, where said second mounting sleeve portion aperture 40a will also be approximately 1/8 of an inch in diameter.

The length of the second side member 30 in the fully-retracted or shortest-possible position may be approximately 1½ inches and the length thereof when fully extended may be approximately 2 to 2¼ inches, or slightly more. Then length of the complete handle extension 56, including the side bracket member portion 28, may be approximately 5 inches. The dimensions given above provide a very effective device. However, it should be noted that they are exemplary only and should not be construed as specifically limiting the invention to the precise dimensions just referred to, which may be modified considerably within the broad scope of the present invention.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A dental impression tray comprising: a substantially rectangular tray portion comprising a substantially rectangular, thin-sheet, perforate membrane member having integrally connected thereto at opposite side edges thereof a pair of substantially parallel, laterally spaced side parts, said side parts being provided with upwardly and downwardly directed retaining wall portions substantially perpendicularly positioned relative to said thin-sheet membrane member and substantially symmetrically disposed above and below same, said side parts being provided with parallel longitudinally apertured mounting sleeve portions extending therethrough from front to back; and a substantially U-shaped mounting bracket having substantially parallel first and second longitudinal side members connected by a lateral member and with said first and second longitudinal side members being slidably received within the corresponding mounting sleeve portions of said pair of substantially parallel side parts of said tray portion and thereby controllably removably and interchangeably mounting same.

2. A dental impression tray as defined in claim 1, wherein said mounting bracket is provided with handle means extended to a location remote therefrom for convenient manual grasping thereof at a location exterior of one's mouth while positioning the mounting bracket and tray portion within a mouth for the purpose of making dental impressions of teeth in an impressionable material adapted to be carried by said tray portion.

3. A dental impression tray as defined in claim 2, wherein said mounting bracket and handle means are made of a material capable of being sterilized without damage thereto.

4. A dental impression tray as defined in claim 2, wherein said handle means comprises an extension of one of said parallel longitudinal side members of said mounting bracket and is provided at a remote end of said extended portion thereof with an enlarged handle portion removably mounted thereon.

5. A dental impression tray as defined in claim 4, wherein said mounting bracket and handle means are made of a heat-resistant sterilizable metallic material.

6. A dental impression tray as defined in claim 4, wherein said handle portion and the extended longitudinal side member of said mounting bracket comprising the remainder of said handle means are provided with controllably separable engagement means to allow the removal of said handle portion therefrom when said tray portion is to be slidably removed from or mounted on said mounting bracket and to subsequently provide for the firm re-engagement of said handle portion thereon.

7. A dental impression tray as defined in claim 4, wherein the other one of said longitudinal side members of said mounting bracket from the one thereof extended to define said handle means is provided with telescopic extension sleeve means and travel limiting stop means to allow same to be extended to a desired length to receive and mount a corresponding mounting sleeve portion of a corresponding interchangeable tray portion of a corresponding selected length adapted for the particular dental impression work to be done.

8. A dental impression tray as defined in claim 1, wherein said tray portion is made of integral molded plastic construction of a material capable of being sterilized without damage thereto.

9. A dental impression tray as defined in claim 1, wherein said tray portion is made of integral molded plastic construction of heat-resistant sterilizable polypropylene material.

10. A dental impression tray as defined in claim 1, wherein one of said longitudinal side members of said mounting bracket is provided with telescopic extension sleeve means to allow same to be extended to a desired length to receive and mount a corresponding mounting sleeve portion of a corresponding interchangeable tray portion of a corresponding selected length adapted for the particular dental impression work to be done.

11. A dental impression tray as defined in claim 1, wherein said retaining wall portions are provided with a plurality of through-passing apertures of a size such as to allow an impressionable material to at least partially extend thereinto.

References Cited

UNITED STATES PATENTS 2,583,170   1/1952   Getz _____ 32—19

ROBERT PESHOCK, Primary Examiner